United States Patent
Nitta et al.

(10) Patent No.: US 6,793,121 B2
(45) Date of Patent: Sep. 21, 2004

(54) CLASP HAVING A FLANGE TO COUPLE A HEAT EXCHANGER TO A DEVICE IN A COOLING SYSTEM

(75) Inventors: Minoru Nitta, Upland, CA (US); Ramchandra L. Patel, Southgate, MI (US)

(73) Assignees: Newfield Technology Corporation, Upland, CA (US); Visteon Automotive Systems, Plymouth, MI (US)

( * ) Notice: Subject to any disclaimer, the term of this patent is extended or adjusted under 35 U.S.C. 154(b) by 87 days.

(21) Appl. No.: 10/096,444

(22) Filed: Mar. 12, 2002

(65) Prior Publication Data

US 2003/0173069 A1 Sep. 18, 2003

(51) Int. Cl.[7] ............................................. B23K 31/00
(52) U.S. Cl. ........................ 228/138; 165/178; 228/139
(58) Field of Search ..................... 165/178, 67; 62/509; 228/138, 139

(56) References Cited

U.S. PATENT DOCUMENTS

| | | | |
|---|---|---|---|
| 4,330,077 A | * | 5/1982 | Young ......................... 228/139 |
| 4,770,240 A | | 9/1988 | Dawson et al. |
| 5,090,477 A | | 2/1992 | Sprow et al. |
| 5,363,910 A | * | 11/1994 | Baba et al. .................. 165/153 |
| 5,632,332 A | * | 5/1997 | Hanafusa ..................... 165/178 |
| 5,685,364 A | * | 11/1997 | Harris .......................... 165/67 |
| 5,758,904 A | * | 6/1998 | Ross et al. ..................... 285/23 |
| 5,934,102 A | * | 8/1999 | DeKeuster et al. ........... 62/509 |
| 6,154,960 A | | 12/2000 | Baldantoni et al. |
| 6,216,777 B1 | | 4/2001 | Rhodes et al. |
| 6,293,011 B1 | * | 9/2001 | Hasegawa et al. ..... 29/890.052 |
| 6,446,857 B1 | * | 9/2002 | Kent et al. .................. 228/139 |

* cited by examiner

Primary Examiner—Allen J. Flanigan
(74) Attorney, Agent, or Firm—Pillsbury Winthrop LLP (57) ABSTRACT

An automobile climate control system has a coolant dispersing device to allow coolant to flow. A heat exchanger cools the coolant. A manifold block allows the coolant to transfer between the coolant dispersing device and the heat exchanger. The manifold block is in communication with the heat exchanger and the coolant dispersing device. At least one separately formed clasp is fixedly mounted to the manifold block. The at least one clasp has separate legs to fixedly mount the at least one clasp to the heat exchanger. The at least one clasp has a first flange member. A first end of the first flange member is fixedly mounted to an aperture in the manifold block.

13 Claims, 12 Drawing Sheets

PRIOR ART

FIG. 9

CLASP HAVING A FLANGE TO COUPLE A HEAT EXCHANGER TO A DEVICE IN A COOLING SYSTEM

BACKGROUND OF THE INVENTION

1. Field of the Invention

The present invention relates generally to the art of automobile climate control systems, and more particularly, to a system, method, and apparatus for connecting the components of the climate control system to a manifold block of a condenser via a fitting clasp having a flange.

2. Discussion of the Related Art

Automotive climate control systems are well known in the art. Automobiles typically utilize climate control systems to absorb and dissipate heat from inside a passenger cabin to the outside of the automobile. In such systems, a manifold block connects the condenser manifold to both a compressor and an expansion valve. The manifold block connects the compressor to the condenser and the condenser to an evaporator, so that refrigerant can flow between them. Refrigerant at high temperature and high pressure in vapor form flows through the pipes from the compressor to the condenser, via the condenser manifold. In the condenser, the high temperature and high pressure refrigerant in vapor form is condensed to form refrigerant in high temperature high pressure liquid form. Then, the liquid is passed through an expansion valve. The valve restricts the flow of the refrigerant, lowering the pressure of the liquid forming low pressure low temperature liquid. This liquid refrigerant is then passed through the evaporator, where heat from the passenger cabin is absorbed as the refrigerant liquid evaporates. The resulting low pressure low temperature refrigerant flows to the compressor, which pressurizes the refrigerant to form high pressure high temperature vapor, repeating the process.

In such systems, the manifold block may be coupled to the condenser manifold via a clasp that is physically part of the manifold block. When the manifold block is coupled to the condenser manifold, the clasp is typically soldered or brazed to the condenser manifold. However, it is relatively inefficient for the fitting clasp to be a molded part of the manifold block, because if the fitting clasp is damaged or bent in any way before being soldered or coupled in any way to the condenser, the entire manifold block may be unusable. Also, the fitting clasp is susceptible to breakage after soldering, because it is only soldered/brazed to the condenser manifold at certain points. In other words, only a portion of the surface of the fitting clasp is soldered/brazed to the condenser manifold. Moreover, traditional fitting clasps are typically much shorter than the length of the manifold block and therefore may break if the manifold block is subjected to a twisting force.

Figure 1A:
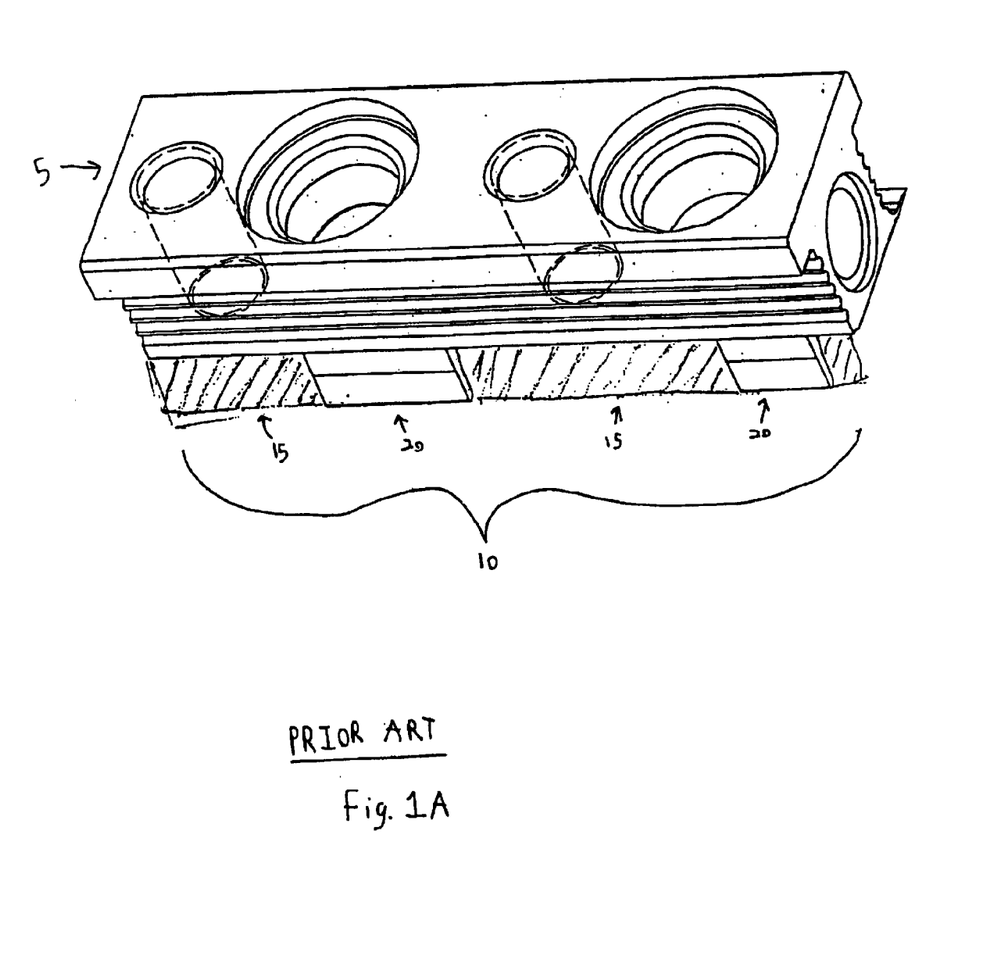
FIG. 1A illustrates a manifold block 5 that has been used in the prior art.

FIG. 1A illustrates a manifold block 5 that has been used in the prior art. When the manifold block is initially manufactured, the side portions 10 utilized to form the claps 20 are the same length as the manifold block 5. Sections of the side portions 10 must then be machined away to reduce the mass. During machining, the excess portions 15 are cut away. Such a method is wasteful because the excess portions typically must be scrapped.

Some systems also solder or braze the fitting clasps on the manifold block, to secure the manifold block to the manifold. In such systems, either the solder or the braze material is typically manually placed onto specific points of the clasps, and then heated up, forming a connection between the clasps and the manifold block, and between the clasps and the condenser manifold. However, such use of solder or braze material can be problematic, because solder or braze material in ring or paste form, is typically placed on the manifold block and the condenser manifold, or the clasps before being heated. Such solder/braze material may be knocked off before heating, or an operator may simply forget to include them. Consequently, the bond between the clasps and the manifold block, or between the clasp and the condenser, is weakened. Furthermore, parts are susceptible to movement during soldering or brazing, leading to higher defect rates.

Fitting clasps having flat top and bottom surfaces have been used by systems in the art. When such fitting clasps are placed between the condenser manifold and the manifold block, the refrigerant typically flows through an aperture on at least one of the fitting clasps. However, since the fitting clasp is flat, if the entire top and bottom are not fully bonded with each of the condenser manifold and the manifold block via braze material or solder, there is a possibility that the refrigerant can leak from the un-bonded location. To minimize this problem, prior art designs utilize a "sleeve" to connect the manifold block to the condenser manifold. The sleeve is a piece of metal used to line up an output aperture of the manifold block with an aperture on the condenser manifold so that refrigerant can flow between the condenser manifold and the manifold block. The sleeve is physically separate piece from the manifold block and the condenser manifold. However, it is inefficient to use such a sleeve because the sleeve is typically soldered or brazed onto the manifold block and the condenser manifold. As discussed above, the use of such solder or braze can be problematic.

Some systems in the prior art also utilize a condenser having a receiver tank. The receiver tank is utilized to hold excess refrigerant flowing out of the condenser. The receiver tank is typically located between the condenser and an expansion valve. The receiver tank can be coupled to the condenser manifold via brackets having an aperture to allow the refrigerant to flow between the condenser manifold and the receiver tank. However, such clasps are often connected via solder to the condenser manifold and the receiver tank. Also, a separate "sleeve" piece is used to line up a hole in the bracket with each of the condenser manifold and the receiver tanks. Consequently, the brackets have deficiencies similar to those of the fitting clasps used to couple manifold blocks to condenser manifolds.

The prior art is therefore deficient because solder is used to couple (a) a fitting clasp to a manifold block and a condenser manifold, and (b) brackets to a receiver tank and a condenser manifold. Also, refrigerant may leak when flowing between (a) the manifold block and the condenser manifold, and (b) the receiver tank and the condenser manifold because a separate "sleeve" piece is used to line up an aperture in the bracket or fitting clasps with the respective aperture on the condenser manifold and the bracket and fitting clasp.

DETAILED DESCRIPTION

According to an embodiment of the present invention, fitting clasps couple a manifold block to a condenser manifold. The fitting clasps are coupled to both the manifold block and the condenser manifold by an aluminum clad material having a melting temperature below that of the material forming the manifold block, the fitting clasps, and the condenser manifold. The fitting clasps are made from aluminum clad material, and are then placed in between the manifold block and the condenser manifold. Other embodiments may utilized a copper braze material instead of an aluminum clad material. The entire device is heated to a temperature where the clad material on the outer surface of the fitting claps melts, but the material forming the manifold block, the base material of the fitting clasps, and the condenser manifold does not. After the clad material melts, the entire device is allowed to cool. As the clad material cools, a strong bond is formed, making a sturdy connection between the manifold block, the fitting clasps, and the condenser manifold. Such an embodiment is suitable for use within an automotive climate control system of an automobile, for example.

Figure 1B:
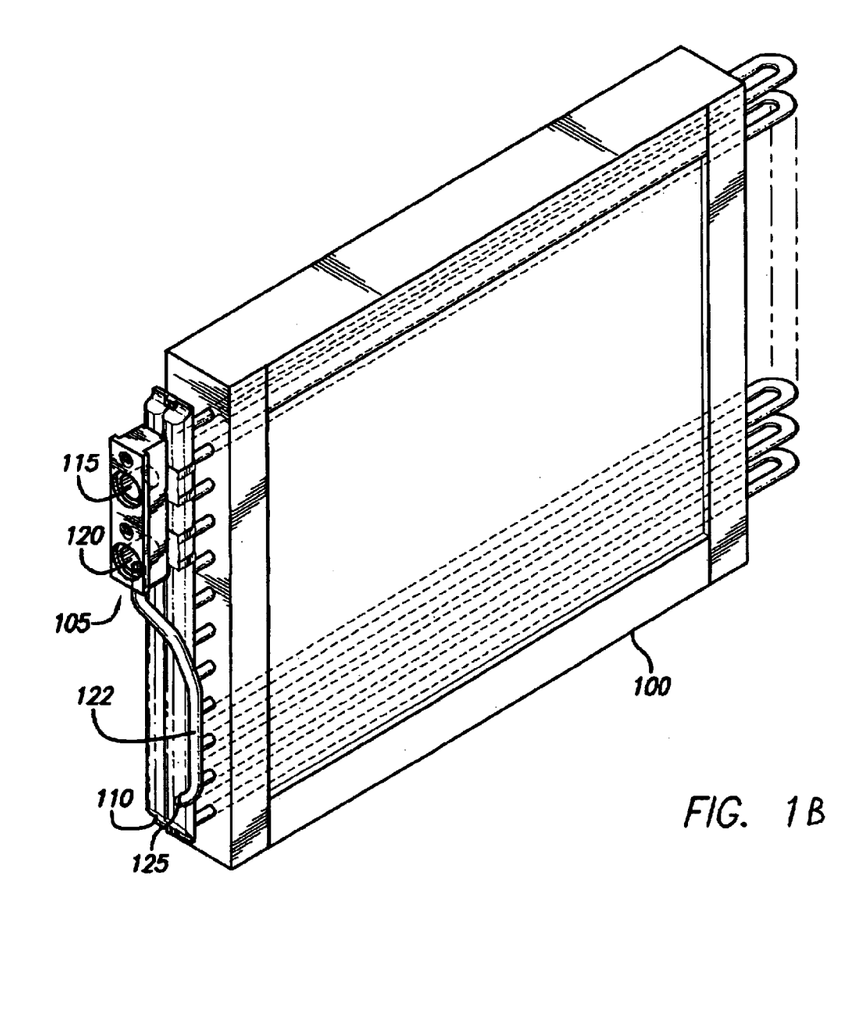
FIG. 1B shows a general overview of a manifold block coupled to a condenser of an automotive climate control system according to an embodiment of the present invention.

FIG. 1B shows a general overview of a manifold block 105 coupled to a condenser 100, or a heat exchanger, of a climate control system according to an embodiment of the present invention. In the embodiment, the automotive climate control system may serve to remove excess heat from inside the passenger cabin of an automobile. A refrigerant, such as Freon, may flow through pipes or tubes of an evaporator, located inside the passenger cabin. As the refrigerant in liquid form flows through the evaporator, it absorbs heat from the passenger cabin as it evaporates into vapor form. A compressor serves to compress the resulting refrigerant to a high temperature, high pressure form. The resulting high pressure, high temperature refrigerant vapor reaches an inlet aperture 115 of the manifold block 105. Refrigerant vapor flowing through the inlet aperture 115 enters a condenser manifold 110 and the condenser 100, where it is condensed into liquid form.

The condenser 100 is comprised of a plurality of tubes or pipes through which refrigerant may circulate. The tubes or pipes may be formed of a heat conductive material, such as metal. In an embodiment within an automobile, as the automobile is driven, air from outside the automobile comes in contact with the tubes or pipes of the condenser 100, and absorbs heat from the condenser 100 pipes, effectively cooling the refrigerant contained therein. A compressor pump pumps the refrigerant between the condenser 100 and an evaporator. Once the refrigerant within the pipes of the condenser 100 has condensed back into liquid form, it is connected to an expansion valve through the outlet aperture 120. The drop in pressure as the refrigerant passes through the expansion valves causes the refrigerant to form into a low pressure, low temperature state. The refrigerant in the low pressure, low temperature form can now be returned to the evaporator, completing the cycle.

As shown in FIG. 1B, when the refrigerant is received through the inlet aperture 115 of the manifold block 105, it flows into the top of the condenser manifold 110. The refrigerant travels downward through the pipes of the condenser 100, and condensed refrigerant in the pipes near the bottom of the condenser 100 flows into manifold 110 and through an aperture 125 into a pipe 122. The refrigerant then is pumped back into the expansion valve through the outlet aperture 120. Although the embodiment shown in FIG. 1 has a manifold block 105 connected near the top of the condenser manifold 110, the manifold block 105 may be connected to the bottom of the condenser manifold 110, or in another suitable location on the condenser manifold 110, in other embodiments. Other embodiments may also include an inlet aperture 115 located above the outlet aperture 120 on the manifold block 105.

Figure 2:
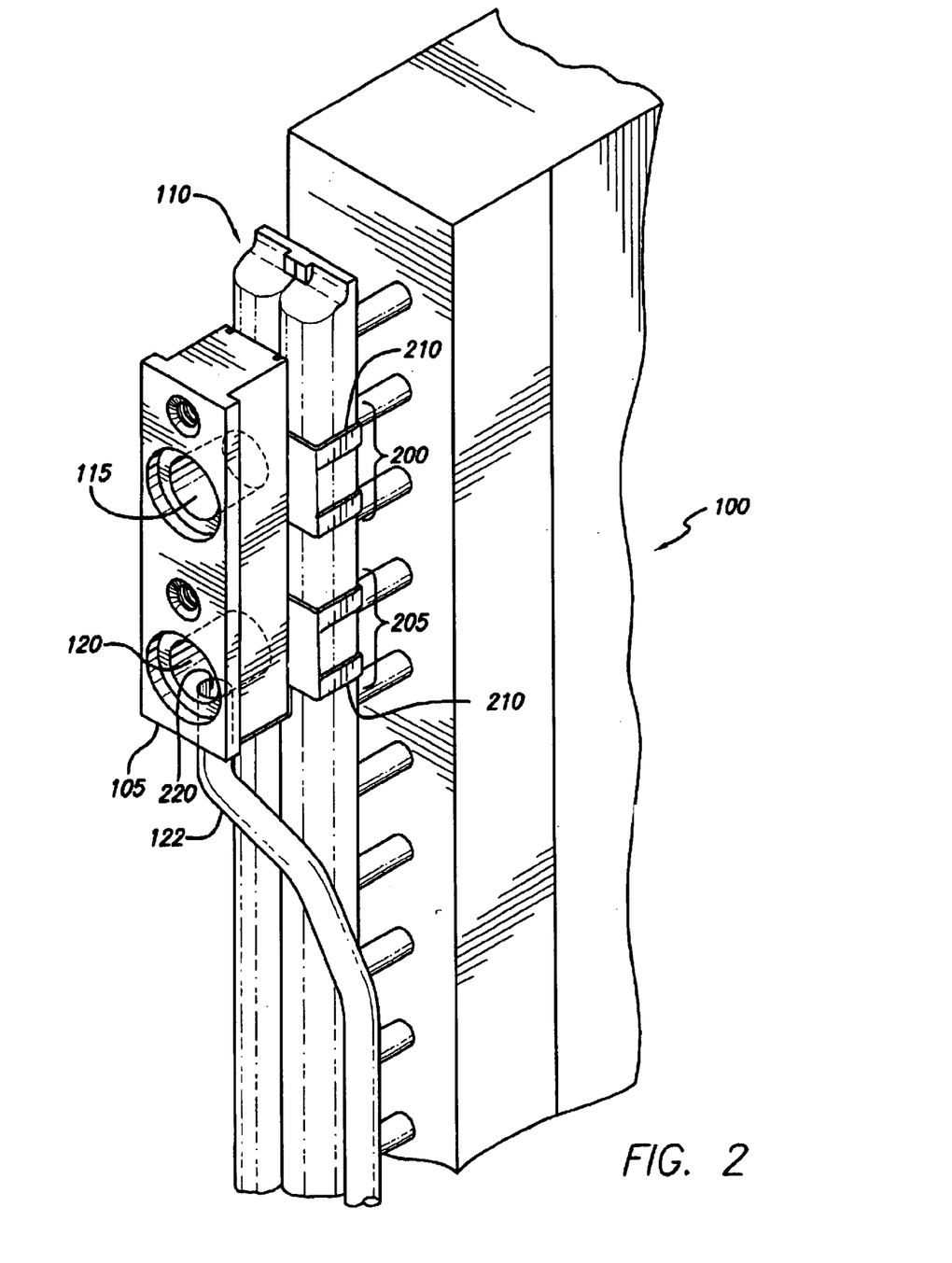
FIG. 2 illustrates a close-up view of the manifold block coupled to a condenser manifold according to an embodiment of the present invention.

FIG. 2 illustrates a close-up view of the manifold block 105 connected to the condenser manifold 110 according to an embodiment of the present invention. In the embodiment, two fitting clasps 200 and 205 connect the manifold block 105 to the condenser manifold 110. The manifold block 105 is located on top of the front vertical face of the condenser manifold 110. A top fitting clasp 200 has a set of legs 210 that contact the front vertical face of the condenser manifold 110 and extend along the side vertical faces of the condenser manifold 110. As explained in further detail in the discussion of FIG. 2 below, the top fitting clasp 200 has an aperture that allows refrigerant to flow to the condenser manifold 110 through the aperture in the top fitting clasp 200, and from the inlet aperture 115 of the manifold block 105. In the embodiment shown in FIG. 2, a bottom fitting clasp 205 is coupled to the manifold block 105 and the condenser manifold 110 at a location below the top fitting clasp 200. The bottom fitting clasp 205 also has a plurality of legs 210 that serve to couple the manifold block 105 to the condenser manifold 110. The manifold block 105 has a side aperture 220, which receives liquid from the bottom of condenser manifold 110 through the aperture 125 and pipe 122. The liquid may then flow out of the outlet aperture 120.

The legs 210 of the top 200 and bottom 205 clasps fit tightly around the front vertical face and side vertical faces of the condenser manifold 110 and serve to prevent slippage between the manifold block 105 and the condenser manifold 110. In other embodiments, the vertical face may not be necessary based on the application requirements. Connected to a hole 220 on the bottom side of the manifold block 105 is a pipe 122 that extends to an aperture 125 near the bottom of the condenser manifold 110 (see FIG. 1). The metal pipe 122 is utilized to allow refrigerant to flow from the bottom of the condenser 100. In an embodiment, refrigerant from the compressor enters the manifold block 105 through the inlet aperture 115. Once inside the manifold block 105, the refrigerant flows into the condenser manifold 110 through the inlet aperture 115 and down into the condenser 100. The refrigerant liquid then flows down to the bottom of the condenser 100. At the bottom, the liquid refrigerant flows back up to the manifold block through the pipe 122 at the aperture 125. The pipe 122 may be formed of metal, or of any other suitable material.

The outlet aperture 120 allows refrigerant to flow from the condenser 100 to the expansion valve. When an automobile or other device utilizing this system is in operation, heated refrigerant gas may flow into the condenser 100 through the inlet aperture 115 and flow throughout the condenser 100 while outside air absorbs heat from the refrigerant. After the refrigerant has flowed through the condenser 100, the condensed refrigerant may exit the condenser 100 through aperture 125 at the bottom of condenser manifold 110 and flow up through the pipe 122 to side aperture 220 in manifold block 105. The liquid refrigerant may then flow out of the manifold block via outlet aperture 120.

The top 200 and bottom 205 clasps serve to prevent slippage between the manifold block 105 and the condenser manifold 110. Although only top 200 and bottom 205 clasps are illustrated in FIG. 2, other embodiments may use more or fewer than two clasps. In the embodiment shown in FIG. 2, each clasp has four "legs" 210, or metal extensions extending in a direction perpendicular to front face of the clasp. In an embodiment having four legs 210 on each clasp, two legs 210 extend on each side of the clasp, with a space between each leg 210 on each side. Other embodiments may use more or less than four legs 210.

Figure 3:
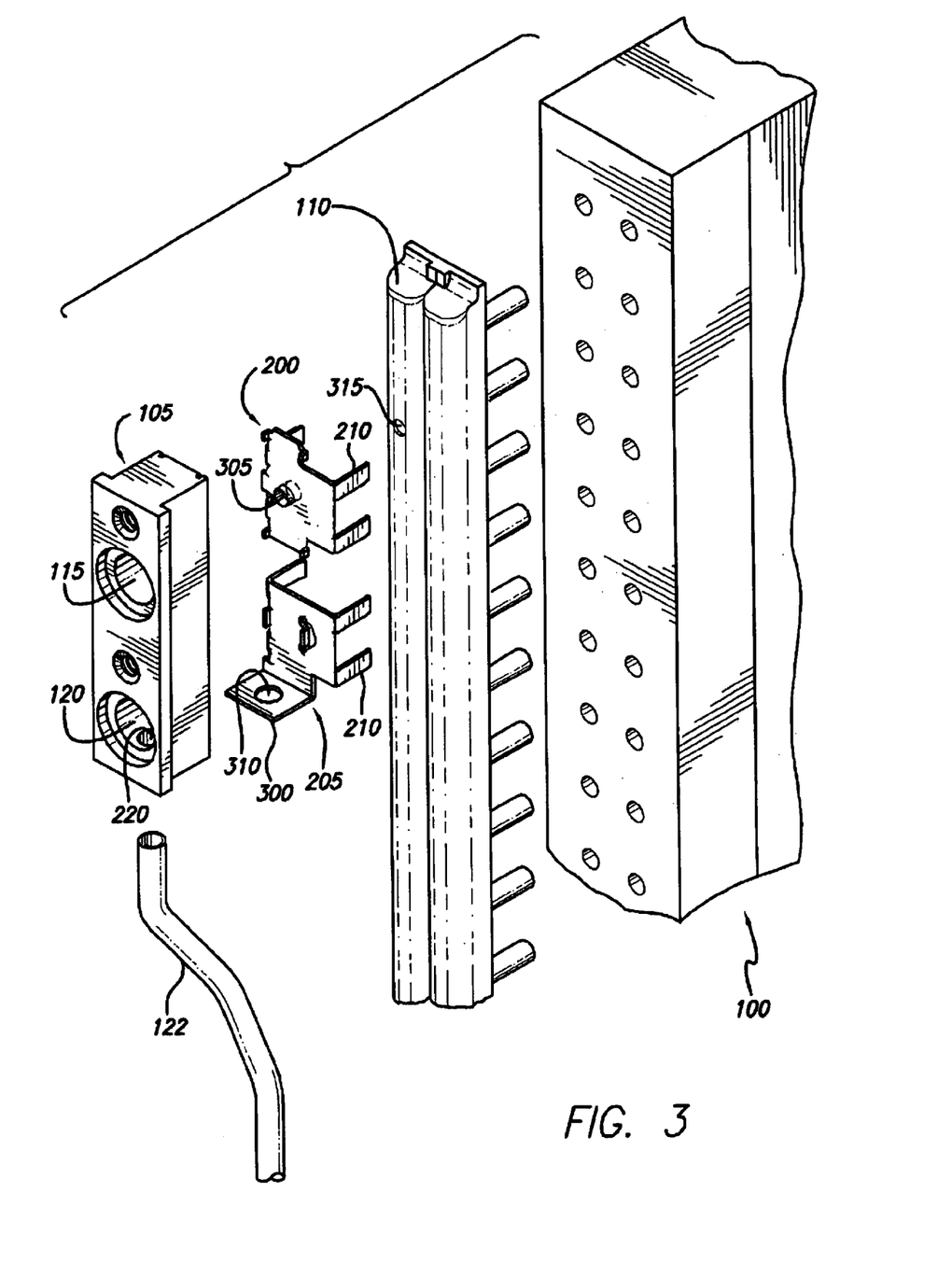
FIG. 3 illustrates an exploded close-up view of the manifold block, the fitting clasps, the condenser manifold and a pipe connected to the manifold block according to an embodiment of the present invention.

FIG. 3 illustrates an exploded close-up view of the manifold block 105, the top and bottom fitting clasps 200 and 205, the condenser manifold 110 and the pipe 122 connected to the manifold block 105 according to an embodiment of the present invention. A cylindrical flange 305 extends in a direction perpendicular to the top face of the top fitting clasp 200, in a direction away from the legs 210 as well as in the direction of the legs 210. The cylindrical flange 305 is a protrusion on both the top and bottom surface of the top fitting clasp 200, and it features an aperture through which refrigerant may pass when the top fitting clasp 200 is coupled to the condenser manifold 110 and the manifold block 105. When top fitting clasp 200 is positioned beneath the manifold block 105, the cylindrical flange 305 extends into the outlet aperture 120. The condenser manifold 110 also has an aperture 315 near its top through which the refrigerant may flow. The refrigerant flows into the aperture 315, through the cylindrical flange 305, from the inlet aperture 115. The top side of the cylindrical flange 305 extends into the manifold block 105, and the bottom side extends into the aperture 315 of the manifold 110, and is bonded at both locations. The top and bottom sides of the cylindrical flange 305 may be formed along the same center line and from a common material sheet (i.e., the same piece of sheet metal).

In an embodiment of the present invention, the top fitting clasp 200, including cylindrical flange 305, and the bottom fitting clasp 205 are all made from an aluminum clad material, and the manifold block 105 and the condenser manifold 110 are formed of an aluminum alloy having a melting temperature higher than that of the cladding portion of the aluminum clad material. In the embodiment, the melting point of the aluminum alloy may be 100 degrees higher than that of the aluminum clad material, for example. The top 200 and bottom 205 fitting clasps are placed underneath the manifold block 105, and on top of the condenser manifold 110. The top fitting clasp 200 is positioned so that the cylindrical flange 305 is positioned on top of the aperture 315 in the condenser manifold 110 and underneath the manifold block 105, and the flange 305 extends into the inlet aperture 115 and into the aperture 315 of the condenser manifold 110. The manifold block 105, the top 200 and bottom 205 fitting clasps, and the condenser manifold 110 are then all heated to a temperature greater than the melting point of the aluminum clad material, but below that of the aluminum alloy forming the manifold block 105, the core of the top 200 and bottom 205 fitting clasps, and the condenser manifold 110. The aluminum clad material melts, and then the condenser manifold 110, the top 200 and bottom 205 fitting clasps, and the manifold block 105 are allowed to cool. As they cool, the aluminum clad material solidifies and forms a strong bond between the top 200 and bottom 205 fitting clasps, the condenser manifold 110, and the manifold block 105, as well as between the cylindrical flange 305 and each of the inlet aperture 115 and the aperture 315 of the manifold 110. In other embodiments, suitable materials other than aluminum or the aluminum clad material may be utilized. Copper coated steel or plain steel may be such a suitable material.

FIG. 3 also illustrates the bottom fitting clasp 205. In the illustrated embodiment, the bottom fitting clasp 205 has four legs 210. Other embodiments may use more or fewer than four legs 210. The bottom fitting clasp 205 has an vertical face 300 that extends in a direction perpendicular to the front face of the bottom fitting clasp 205, away from the legs 210. The vertical face 300 has an aperture 310 located around its center. The pipe 122 connects to the aperture 220 through the aperture 310 on the vertical face 300 of the bottom fitting clasp 205. When the bottom fitting clasp 205 is correctly positioned, the vertical face 300 is bonded to the bottom face of the manifold block 105 via the clad material. When bonded, the vertical face 300 serves to prevent the manifold block 105 from rotating in an angular direction. The clad material from the vertical face 300 forms a leak-free bond with the pipe 122 at the side aperture 220 of the manifold block 105.

When in place, each leg 210 of the top 200 and bottom 205 clasps wrap onto a side of the condenser manifold 110. When the legs 210 have been coupled to the condenser manifold 110, they serve to prevent the manifold block 105 from rotating when subjected to an angular force or torque. This is necessary because the metal pipe 122 extending to the bottom of the condenser manifold 110 may break or become dislodged if the manifold block 105 were to rotate in such a direction. The top fitting clasp 200 also has the cylindrical flange 305 through which refrigerant may flow when the top fitting clasp 200 is coupled to the manifold block 105 and the condenser manifold 110.

Figure 4:
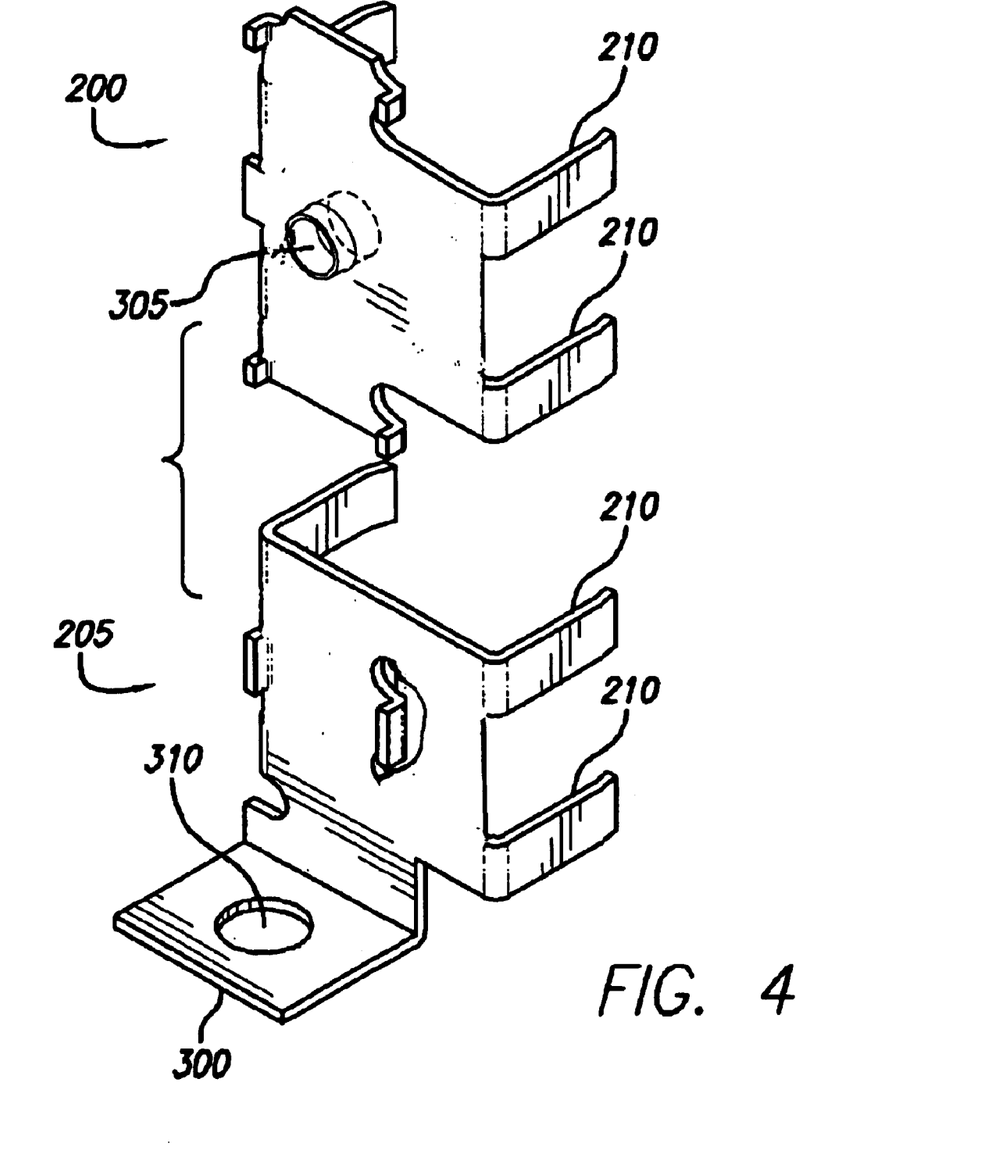
FIG. 4 illustrates a close-up view of top and bottom fitting clasps according to an embodiment of the present invention.

FIG. 4 illustrates a close-up view of top 200 and bottom 205 fitting clasps according to an embodiment of the present invention. As shown in FIG. 4, the cylindrical flange 305 of the top fitting clasp 200 extends in a direction perpendicular to the face thereof, extending in a direction away from the legs 210. The aluminum clad material is used to form the cylindrical flange 305 before the manifold block 105 is positioned on top of it. As discussed above with respect to FIG. 3, during the heating process, the aluminum clad material on the cylindrical flange 305 melts, and is later cooled, forming a strong bond with the structure of the manifold block 105 having the inlet aperture 115.

Figure 5:
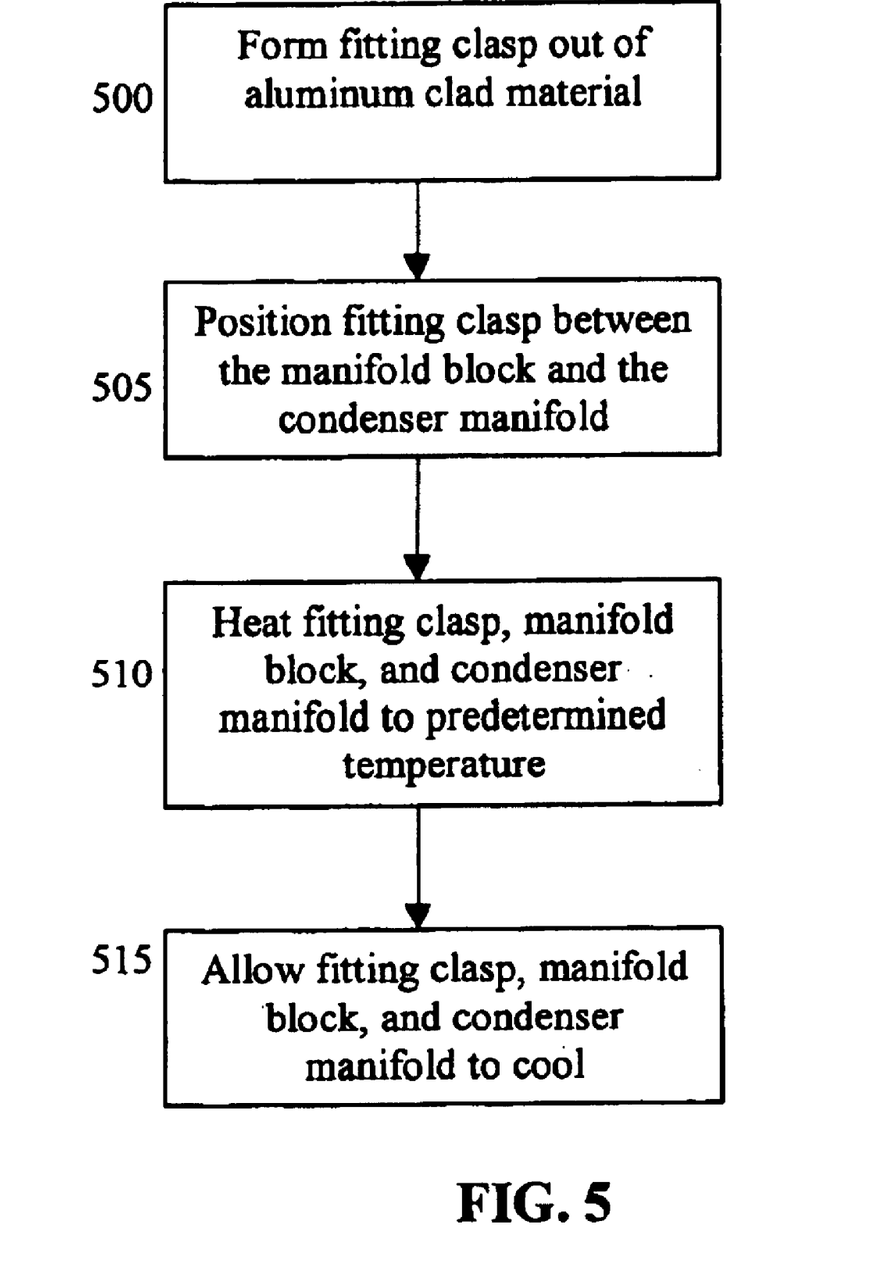
FIG. 5 illustrates the process by which the fitting clasp is coupled to the condenser manifold and the manifold block according to an embodiment of the present invention.

FIG. 5 illustrates the process by which the top fitting clasp 200 is coupled to the condenser manifold 110 and the manifold block 105 according to an embodiment of the present invention. First, the top fitting clasp 200 is formed from 500 clad material. The top fitting clasp 200 may be made entirely of clad material. Alternatively, it may consist primarily of a different metal that is coated on all sides with the clad material. In a situation where the condenser manifold 110, the manifold block 105, and the core of the top fitting clasp 200 are all formed of an aluminum alloy, the clad material may be an aluminum clad material having a melting point one hundred degrees below that of the aluminum alloy, for example. In other embodiments, the manifold block 105 and the condenser manifold 110 may also be made from clad material. At step 505, the top fitting clasp 200 is positioned between the manifold block 105 and the condenser manifold 110. Next, the combination of the top fitting clasp 200, the manifold block 105, and the condenser manifold 110 is heated 510 to a predetermined temperature. The predetermined temperature is typically above the melting point of the clad material, but below that of the aluminum alloy. Finally, the entire assembly is allowed to cool 515. As the assembly cools, the clad material solidifies, forming a strong bond between the condenser manifold 110 and the top fitting clasp 200, and between the manifold block 105 and the top fitting clasp 200, as well as between the flange 305 and the outlet aperture 115.

In other embodiments, a material other than a clad material may be utilized. For example, plain steel or copper coated steel may be utilized. A copper coated steel clasp may be coupled to a steel manifold 110 by heating in a copper brazing furnace in a manner similar to aluminum. Alternatively, if plain steel is utilized, a brazing paste may be applied onto the upper and lower surfaces of the clasp, and then the assembly may be heated in the copper brazing furnace and allowed to cool.

Figure 6:
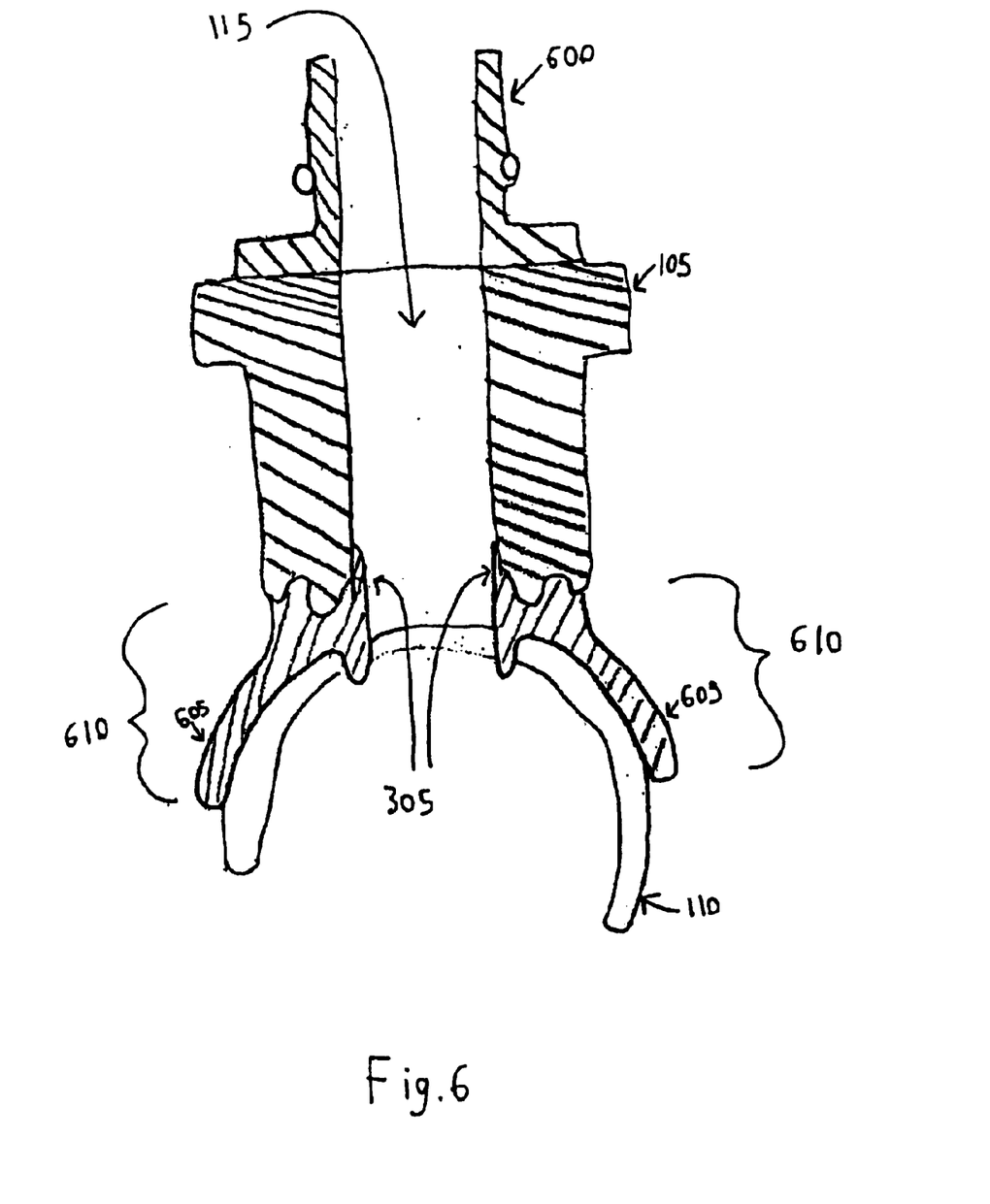
FIG. 6 illustrates a manifold block having curved legs coupled to a condenser manifold according to an embodiment of the invention.

FIG. 6 illustrates a manifold block 105 having curved legs 605 coupled to a condenser manifold 110 according to an embodiment of the invention. As illustrated, an outlet tube 600 from the compressor may be coupled to the inlet aperture 115 of the condenser manifold 105. The outlet tube 600 may be used to couple the compressor of the climate control system to the condenser manifold block 105 so that refrigerant can flow from the compressor through the manifold block 105 and into the condenser manifold 110.

As illustrated, the condenser manifold 110 has a curved edge. The curved edge may have a shape similar to a circle or ellipse. The curved legs 605 of the fitting clasp 610 may curve in the same direction as the condenser manifold 110. When placed on the condenser manifold 110, the curved legs 605 of the fitting clasp 610 may be coupled to the condenser manifold 110 via a clad material. The fitting clasp 610 may also be coupled to the manifold block 105 via the clad material. The fitting clasp 610 may also include a flange 305, which may be coupled to the inlet aperture 115 of the manifold block 105 via the clad material or a copper braze material.

Figure 7A:
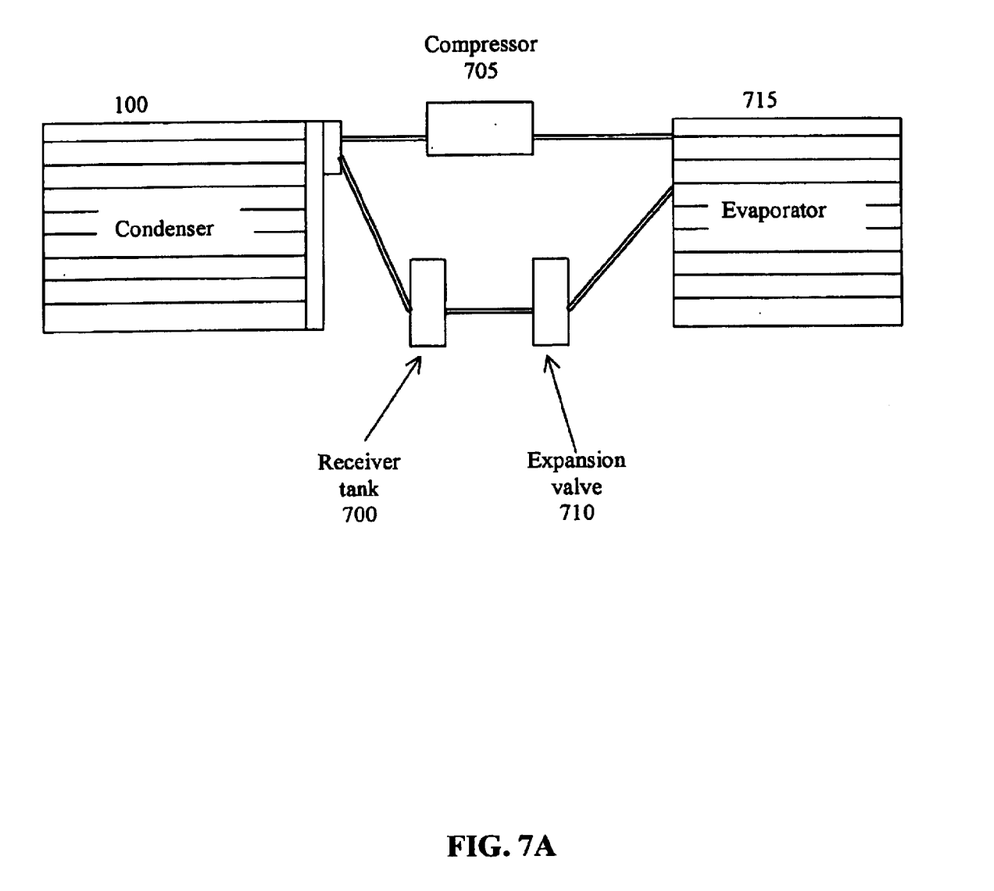
FIG. 7A illustrates an overview of a condenser coupled to a receiver tank utilized to hold excess refrigerant according to an embodiment of the invention.

FIG. 7A illustrates an overview of a condenser coupled to a receiver tank 700 utilized to hold excess refrigerant according to an embodiment of the invention. As shown, the condenser 100 may be coupled to the manifold block 105. As described above in FIG. 1, the manifold block 105 may be coupled to the condenser manifold 110. An expansion valve 710 may be coupled to the outlet aperture 120 of the manifold block 105, and a compressor 705 may be coupled to the inlet aperture 115 of the manifold block 105. The compressor 705 and the expansion valve 710 may also be coupled to an evaporator 715. Refrigerant cycles through the system during the cooling process.

The condenser 100 may include a liquefied form of the refrigerant. The refrigerant may be in liquid form because high temperature and high pressure refrigerant coming from the compressor is condensed into liquid form after heat is released via the condenser 100. The liquefied refrigerant may cycle through the pipes or tubes of the condenser 100, and then out of the condenser 100 via the manifold block 105, and through the expansion valve 710. Once the liquid refrigerant passes through the expansion valve 710, the pressure and the temperature of the liquid refrigerant drops. The pressure decrease causes the refrigerant to cool down to form a mixture containing a large amount of liquid refrigerant and a small portion of gaseous refrigerant as it enters the evaporator 715. The mixture of liquid and gaseous refrigerant then flows through the evaporator 715, absorbing heat from the evaporator 115 as it boils and evaporates. The gaseous refrigerant then flows to the compressor 705, which greatly increases the pressure on the gaseous refrigerant, causing both the temperature and the pressure of the refrigerant to rise. The high temperature, high pressure gaseous refrigerant then flows back into the condenser 100 through the manifold block 105. Heat is released from the refrigerant gas as it passes through the condenser 100, condensing refrigerant gas into liquid form, and the process subsequently repeats itself.

The embodiment shown in FIG. 7A includes a receiver tank 700. The receiver tank 700 may be coupled to the condenser manifold 110 of the condenser 100. The receiver tank has a function of accumulating excess refrigerant in the condenser 100.

Figure 7B:
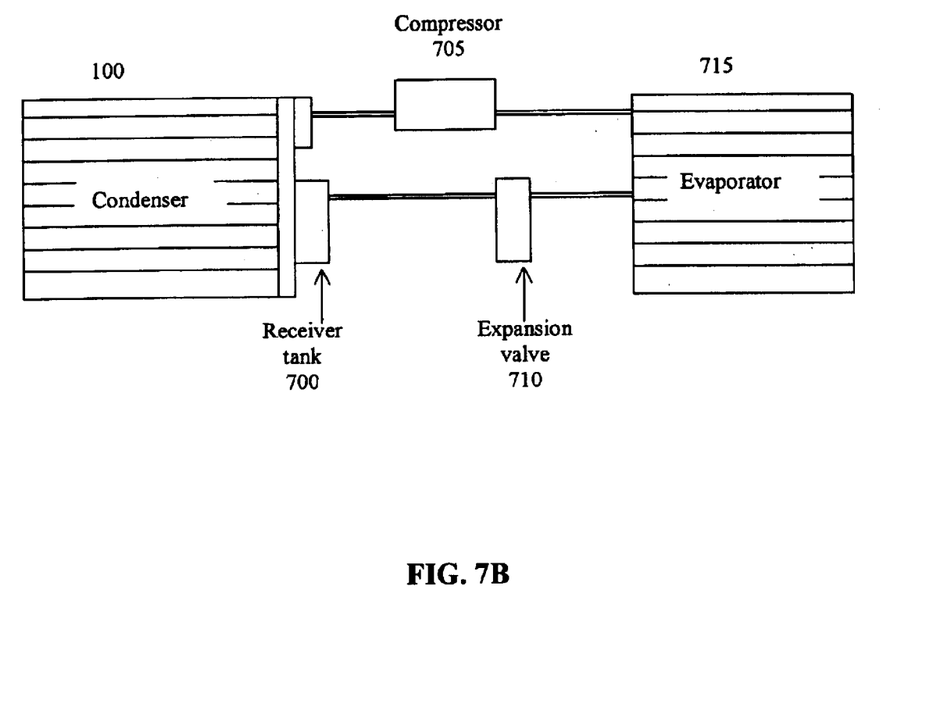
FIG. 7B illustrates an overview of a receiver tank utilized to hold excess refrigerant that is mounted directly onto a condenser according to an embodiment of the invention.

FIG. 7B illustrates an overview of a receiver tank 700 utilized to hold excess refrigerant that is mounted directly onto a condenser 100 according to an embodiment of the invention. The illustrated manifold block 105 may include an inlet aperture 115 to accept refrigerant from the compressor. However, after the refrigerant cycles through the condenser 100, it exits the condenser via an outlet in the receiver tank 700, which is coupled to the expansion valve 710.

Figure 7C:
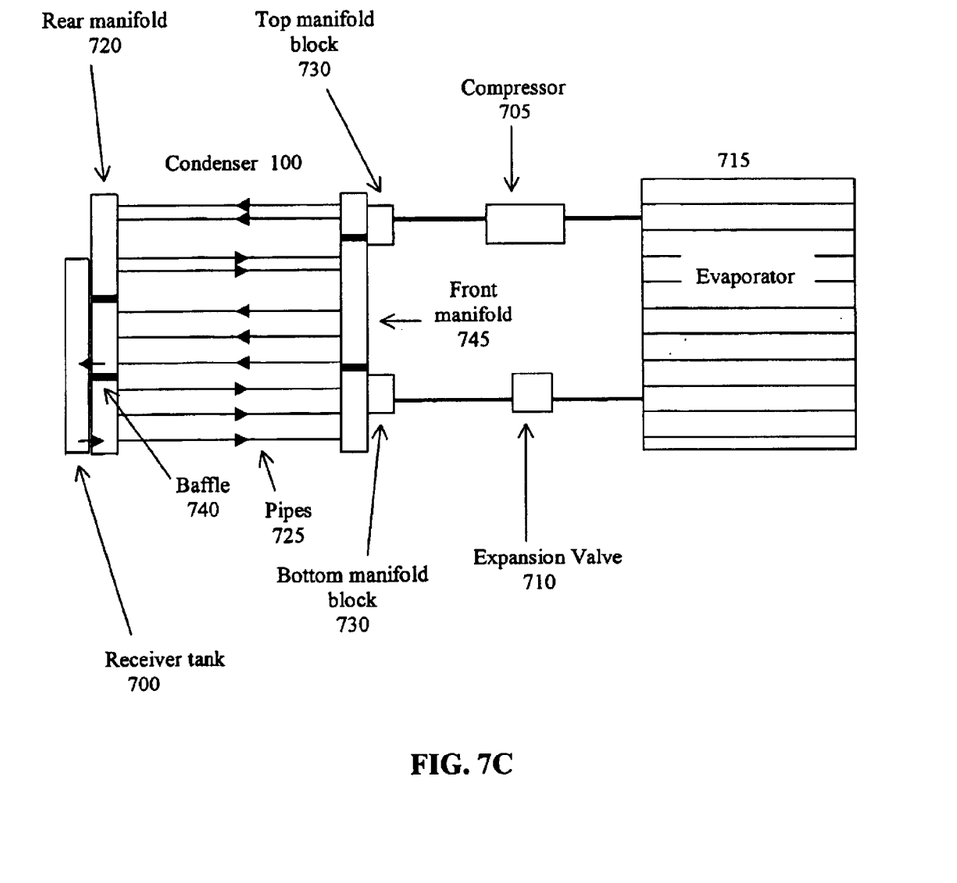
FIG. 7C illustrates an overview of a receiver tank utilized to hold excess refrigerant that is mounted directly onto the side of the condenser facing away from the compressor and the expansion valve according to an embodiment of the invention.

FIG. 7C illustrates an overview of a receiver tank 700 utilized to hold excess refrigerant that is mounted directly onto the side of the condenser 100 facing away from the compressor 705 and the expansion valve 710 according to an embodiment of the invention. As illustrated, the receiver tank 700 is coupled to a rear manifold 720 on the back end of the condenser 100. The condenser is shown having a plurality of pipes 725. The refrigerant typically flows through each of the pipes in one direction. As drawn, a top manifold block 730 and a bottom manifold block 735 are utilized. The top 730 and the bottom 735 manifold block are physically separate. In other embodiments, the top 730 and the bottom 735 manifold block may be coupled together. The refrigerant enters a front manifold 745 through the top manifold block 730. The refrigerant then flows through the top two pipes 725 to the rear manifold 720. The refrigerant then flows down the rear manifold until it reaches the next two pipes 725, through which it flows back to the front manifold 745. The refrigerant then flows down toward the bottom of the front manifold until it reaches a baffle 740, which prevents the refrigerant from flowing further down the front manifold 745, and instead forces the refrigerant to flow back to the rear manifold 720 at the back of the condenser 100. The baffles 740 may be included in both the front manifold 745 and the rear manifold 720 to ensure the refrigerant flows through as many of the pipes 725 as possible. The baffles 740 may be "crushed" or indented portions of the manifold. As the refrigerant flows down the rear manifold 720, some of the refrigerant may collect in the receiver tank 700. After the refrigerant reaches the bottom end of the front manifold 745, it may flow out the bottom 730 manifold block and into the expansion valve 710 and on into the evaporator 715.

Figure 8:
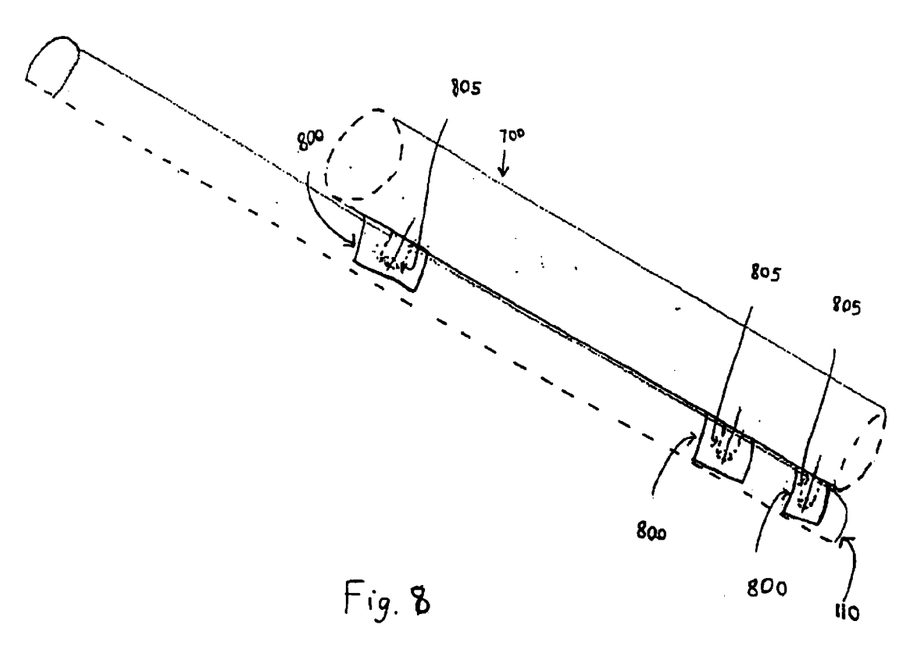
FIG. 8 illustrates a cut-away view of a receiver tank coupled to a condenser manifold according to an embodiment of the invention.

FIG. 8 illustrates a cut-away view of a receiver tank 700 coupled to a condenser manifold 110 according to an embodiment of the invention. The receiver tank 700 may include one or more sets of brackets 800 to couple the receiver tank 700 to the condenser manifold 110. Each of the brackets 800 include a cylindrical flange 805 to couple the receiver tank 700 to the condenser manifold 110. The cylindrical flange 805 may extend into each of the condenser manifold 110 and the receiver tank 700 and bond thereto via a clad material or a copper braze material. The body of the brackets 800 may also be bonded to each of the condenser manifold 110 and the receiver tank 700 via a clad material or a copper braze material.

When the receiver tank 700 is coupled to the condenser manifold 110, refrigerant may flow between the tank 700 and the manifold 110 via apertures in the brackets 800. Although the embodiment shown in FIG. 8 shows "3" brackets 800, other embodiments may use more or fewer than "3" brackets 800. Also, other embodiments may include some brackets 800 that do not have an aperture through which refrigerant may flow. For example, an alternative embodiment may include "6" brackets to couple the receiver tank 700 to the condenser manifold 110, but only "4" of which have apertures through which refrigerant may flow.

Figure 9:
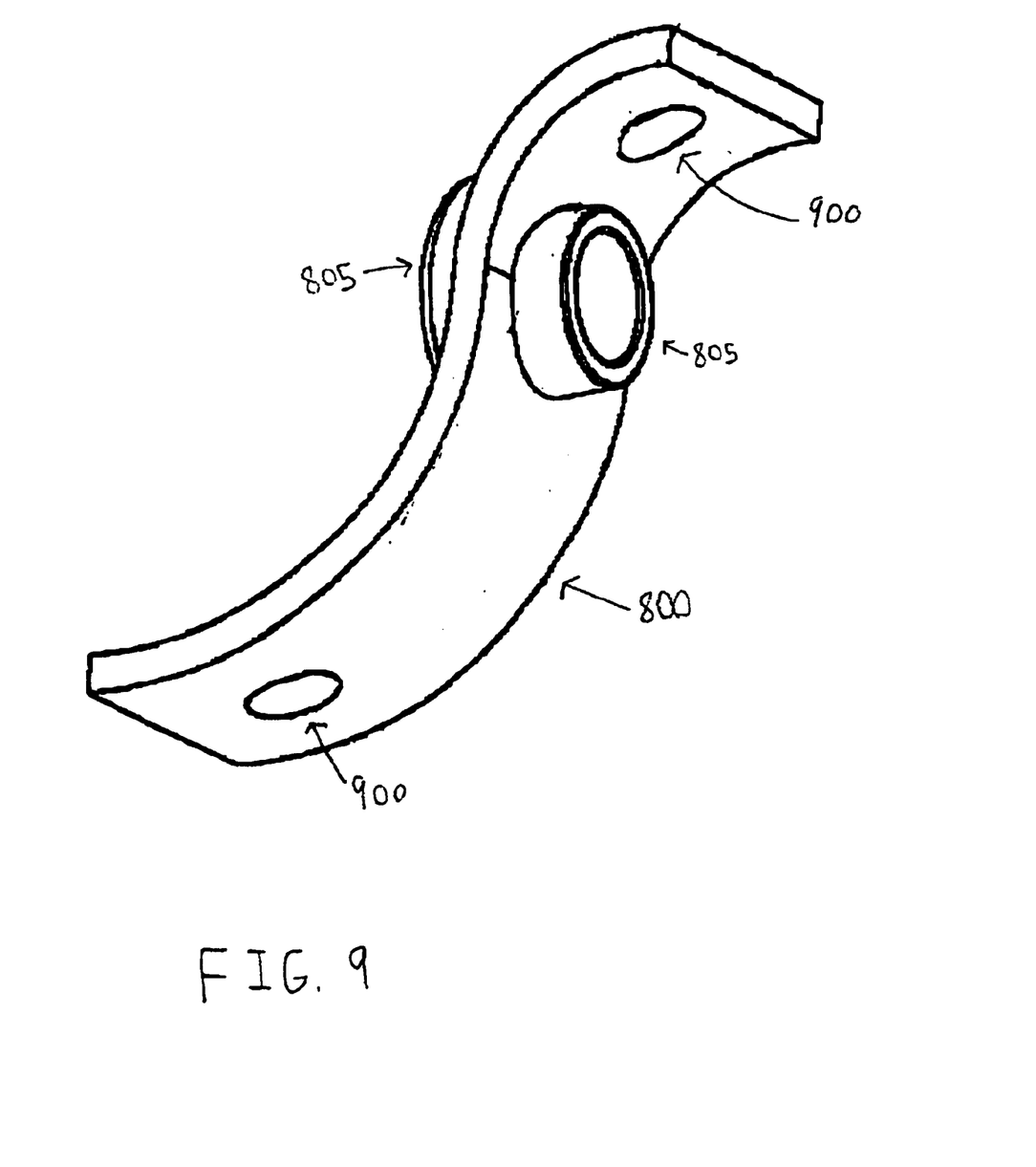
FIG. 9 illustrates a bracket to couple a receiver tank to a condenser manifold according to an embodiment of the invention of the invention.

FIG. 9 illustrates a bracket to couple a receiver tank 800 to a condenser manifold 110 according to an embodiment of the invention. The bracket 800 has a cylindrical flange 805 which may extend in directions away from its body. The bracket 800, including the cylindrical flange 805, may be coated with a clad material. The bracket 800 may be placed on the condenser manifold 110, and its cylindrical flange 805 may extend into an aperture of the condenser manifold 110. The other end of cylindrical flange 805 may extend into the receiver tank 700. When properly positioned, the entire assembly may be heated to a temperature greater than the melting point of the clad material, and then allowed to cool. During the cooling process, the clad material forms a bond between the bracket 800 and its cylindrical flange 805 and each of the condenser manifold 110 and the reserve tank 700. The bracket 800 may also include rivet holes 900, to which a rivet be placed, so that the bracket may be more securely coupled to each of the receiver tank 700 and the condenser manifold 110.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A method of creating an automobile climate control system, comprising:
   using at least one fitting clasp manufactured from a coupling material;
   placing the at least one fitting clasp on a top of a closed chamber forming a manifold connected to a heat exchanger, and a manifold block on a top of the at least one fitting clasp, wherein a first end of a first flange member on the at least one fitting clasp is placed in an aperture in the manifold block; and
   heating the at least one fitting clasp, the manifold, the heat exchanger, and the manifold block to a predetermined temperature.

2. The method according to claim 1, wherein the coupling material is selected from the group consisting of: (a) a clad material and (b) a copper raze material.

3. The method according to claim 2, wherein the clad material is formed of an aluminum alloy.

4. The method according to claim 1, further including coupling the at least one fitting clasp to the manifold on the heat exchanger.

5. The method according to claim 1, wherein the coupling material has a melting point below that of at least one material forming the at least one fitting clasp, the manifold, the heat exchanger, and the manifold block.

6. A method of creating an automobile climate control system, comprising:
   using at least one fitting clasp manufactured from a coupling material;
   placing the at least one fitting clasp on a too of connected to a heat exchanger, and a manifold block on a top of the at least one fitting clamp, wherein a first end of a first flange member on the at least one fitting clasp is placed in an aperture in the manifold block, and wherein a second end of the first flange member is placed into a first aperture of the heat exchanger;
   heating the at least one fitting clasp, the heat exchanger, and the manifold block to a predetermined temperature; and
   allowing the at least one fitting clasp, the heat exchanger, and the manifold block to cool.

7. A method of creating an automobile climate control system, comprising:
   using at least one fitting clasp manufactured from a coupling material;
   placing the at least one fitting clasp on a top of connected to a heat exchanger, and a manifold block on a too of the at least one fitting clasp, wherein a first end of a first flange member on the at least one fitting clasp is placed in an aperture in the manifold block;
   placing at least one bracket manufactured from the coupling material on the heat exchanger, wherein the at least one bracket includes a second flange member to extend into a second aperture of the heat exchanger;
   heating the at least one fitting clasp, the at east one bracket, the heat exchanger, and the manifold block to a predetermined temperature; and
   allowing the at least one fitting clasp, the at least one bracket, the heat exchanger, and the manifold block to cool.

8. The method according to claim 1, further including placing a second end of the first flange member into a first aperture of the manifold.

9. The method according to claim 1, further including placing at least one bracket manufactured from the coupling material on the manifold, wherein the at least one bracket includes a second flange member to extend into a second aperture of the manifold.

10. The method according to claim 9, further including heating the at least one bracket and the manifold to the predetermined temperature and allowing to cool.

11. The method according to claim 1, further including placing at least one bracket manufactured from the coupling material on a receiver tank, wherein the at least one bracket includes a first flange member to extend into an aperture of the receiver tank.

12. The method according to claim 11, further including heating the combination of the at least one bracket and the receiver tank to the predetermined temperature and allowing the combination to cool.

13. A method of creating an automobile climate control system, comprising:

using at least one fitting clasp manufactured from a coupling material;

placing the at least one fitting clasp on a top of connected to a heat exchanger, and a manifold block on a too of the at least one fitting clasp, wherein a first end of a first flange member on the at least one fitting clasp is placed in an aperture in the manifold block;

placing at least one bracket manufactured from the coupling material on a receiver tank, wherein the at least one bracket includes a second flange member to extend into an aperture of the receiver tank;

heating the at least one fitting clasp, the at least one bracket, the heat exchanger, and the manifold block to a predetermined temperature; and allowing the at least one fitting clasp, the at least one bracket, the heat exchanger, and the manifold block to cool.

* * * * *